US012241379B2

(12) United States Patent
Ganji et al.

(10) Patent No.: US 12,241,379 B2
(45) Date of Patent: Mar. 4, 2025

(54) COOLING SYSTEM FOR SEAL ASSEMBLIES

(71) Applicant: General Electric Company, Schenectady, NY (US)

(72) Inventors: Nageswar Ganji, Bengaluru (IN); Ravindra Shankar Ganiger, Bengaluru (IN); Hiranya Nath, Bengaluru (IN); Jonathan K. Remer, Saugus, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/217,913

(22) Filed: Jul. 3, 2023

(65) Prior Publication Data

US 2024/0044262 A1 Feb. 8, 2024

(30) Foreign Application Priority Data

Aug. 3, 2022 (IN) ............................ 202211044397

(51) Int. Cl.
*F01D 25/18* (2006.01)
*F01D 11/00* (2006.01)
*F01D 25/12* (2006.01)

(52) U.S. Cl.
CPC .......... *F01D 25/183* (2013.01); *F01D 11/005* (2013.01); *F01D 25/12* (2013.01); *F05D 2250/283* (2013.01); *F05D 2260/20* (2013.01); *F05D 2260/98* (2013.01)

(58) Field of Classification Search
CPC ........................... F01D 25/183; F05D 2260/98
See application file for complete search history.

(56) References Cited

U.S. PATENT DOCUMENTS

| | | | |
|---|---|---|---|
| 2,470,419 | A | 5/1949 | Voytech |
| 10,385,921 | B2 | 8/2019 | Becker et al. |
| 10,781,709 | B2 | 9/2020 | Sen et al. |
| 11,035,253 | B2 | 6/2021 | Walker |
| 11,054,039 | B2 | 7/2021 | Feinstein et al. |

(Continued)

FOREIGN PATENT DOCUMENTS

| | | | |
|---|---|---|---|
| CN | 203939530 | U | 11/2014 |
| EP | 3119732 | B1 | 4/2018 |
| EP | 3263842 | B1 | 9/2019 |

*Primary Examiner* — Courtney D Heinle
*Assistant Examiner* — Danielle M. Christensen
(74) *Attorney, Agent, or Firm* — Klarquist Sparkman, LLP

(57) ABSTRACT

This disclosure is directed to cooling systems for turbomachine seal assemblies. The seal assemblies include stationary and rotating components and at least one interface between the stationary and rotating components. During operation of the turbomachine, the components of the seal assemblies generate heat, which is removed from the seal assembly by the cooling systems of this disclosure. In some examples, the cooling system includes a reservoir of lubricant that is distributed to a face of one of the components of the seal assembly. In other examples, the cooling system includes a lattice structure capable of retaining lubricant against the components of the seal assembly, or a pressurized jet of lubricant directed against the components of the seal assembly. The cooling systems can further include a combination of deflectors, hairpin members, and channels for distributing the lubricant to the components of the seal assemblies.

15 Claims, 8 Drawing Sheets

(56) References Cited

U.S. PATENT DOCUMENTS

| | | | | |
|---|---|---|---|---|
| 2015/0267816 | A1 | 9/2015 | Boskovski | |
| 2018/0087404 | A1* | 3/2018 | Lighty | F01D 11/003 |
| 2020/0088055 | A1 | 3/2020 | Stoyanov et al. | |
| 2020/0131936 | A1* | 4/2020 | Amador | F01D 25/20 |

* cited by examiner

COOLING SYSTEM FOR SEAL ASSEMBLIES

CROSS REFERENCE TO RELATED APPLICATION

This application claims the benefit of the India Provisional Patent Application No. 202211044397, filed on Aug. 3, 2022, which is incorporated herein in its entirety.

FIELD

The present disclosure relates to turbomachine engine seals, mechanisms for controlling turbomachine engine seal gaps, and dampers for seal gap control mechanisms.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to both the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a compartment or sump that holds a lubricant (for example, oil) for lubricating the bearing. This lubricant may also lubricate gears and other seals. Gaps between the housing and the rotor shaft are necessary to permit rotation of the rotor shaft relative to the housing. The bearing sealing system usually includes two such gaps: one on the upstream end and another on the downstream end. In this respect, a seal disposed in each gap prevents the lubricant from escaping the compartment. The air around the sump may generally be at a higher pressure than the sump to reduce the amount of lubricant that leaks from the sump. Further, one or more gaps and corresponding seals are generally positioned upstream and/or downstream of the sump to create the higher-pressure region surrounding the sump.

The components of the seal assembly are subject to various stresses and physically aggressive conditions associated with the operation of the turbomachine. These conditions can degrade or impair the function of the seal assemblies.

Accordingly, there is a need for improved seal assemblies which are resistant to the stresses of operating a turbomachine.

DETAILED DESCRIPTION

Figure 1:
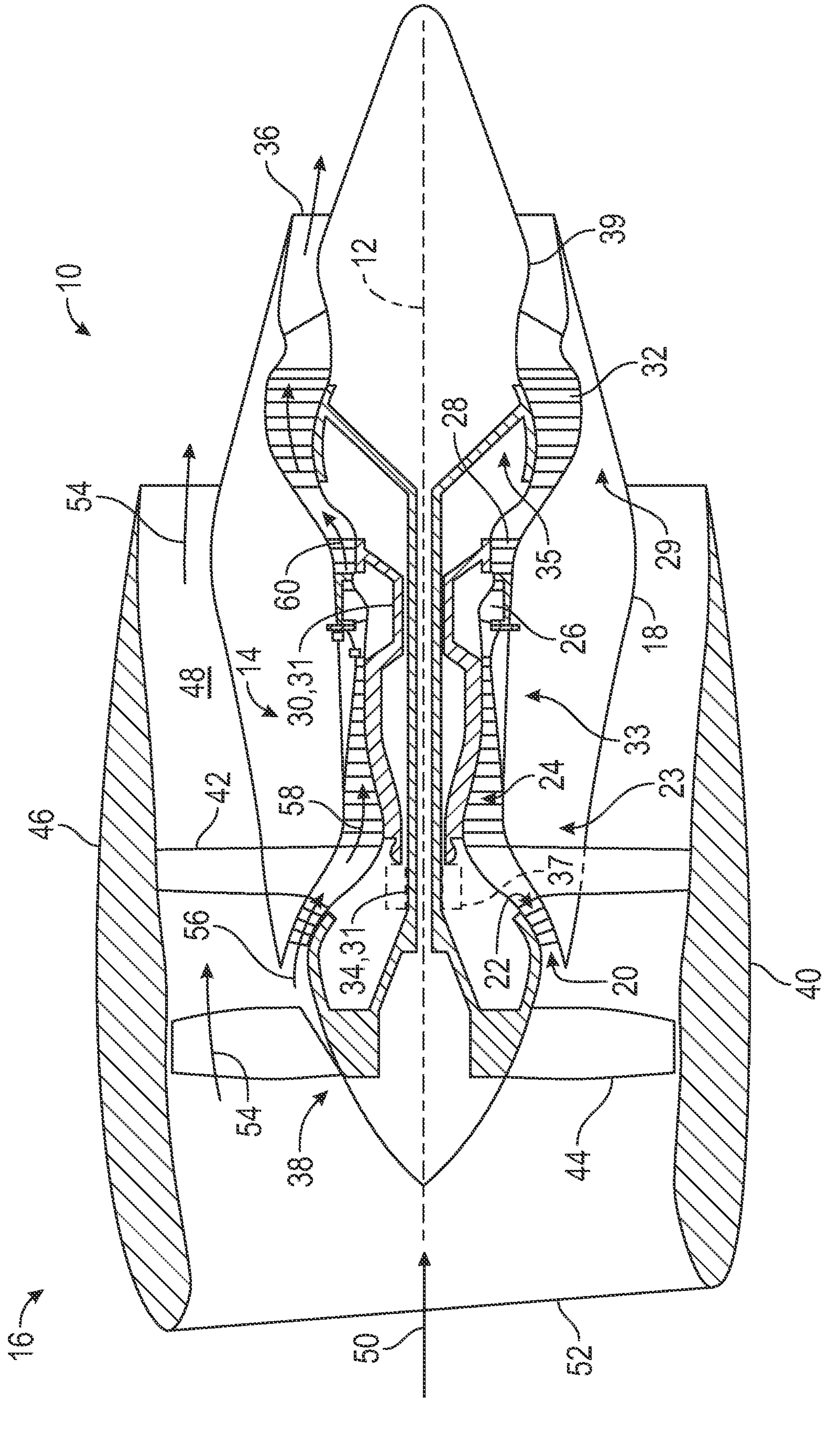
FIG. 1 illustrates a schematic side view of an example turbomachine engine.

Reference now will be made in detail to preferred examples, one or more examples of which are illustrated in the drawings. Each example is provided by way of explanation, not limitation of the preferred examples. In fact, it will be apparent to those skilled in the art that various modifications and variations can be made in the examples discussed without departing from the scope or spirit of disclosure. For instance, features illustrated or described as part of one example can be used with another example to yield a still further example. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations.

The terms “forward” and “aft” refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms “first” and “second” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. In addition, as used herein, the terms “circumferential” and “circumferentially” refer to directions and orientations that extend arcuately about the centerline of the turbine engine.

The terms “radial” or “radially” refer to a direction away from a common center. For example, in the overall context of a turbine engine, radial refers to a direction along a ray extending between a center longitudinal axis of the engine and an outer engine circumference.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are examples of turbomachines and seal assemblies for use with turbomachines. The turbomachine may include a rotating shaft extending along a centerline axis and a fixed housing positioned exterior to the rotating shaft in a radial direction relative to the centerline axis. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a seal may be positioned between the rotating shaft and the pressurized housing to at least partially define the pressurized compartment and to enclose the sump housing.

In certain examples, a seal assembly including a self-lubricating lattice material may allow for a more efficient turbomachine. A self-lubricating lattice material disposed between the rotating portions of a seal assembly and the static portions of the seal assembly can reduce the wear of the various seal assembly components that are in rotating contact with one another when the turbomachine is in an operational condition. Additionally, the use of a self-lubricating lattice material can mitigate heat buildup along the operational seal interface. In some examples, the self-lubricating lattice material can be permeated with a lubricant and/or a coolant. For example, a self-lubricating lattice material can be deposited between a rotating runner and a static sealing element so as to form a lubricant layer between the runner and the sealing element when the turbomachine engine is operational.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high-pressure spool of a turbine engine, it should also be appreciated that the disclosed system and method can be used on any spool within a turbine engine, for example, a low-pressure spool or an intermediate pressure spool.

Referring now to the drawings, FIG. 1 illustrates a cross-sectional view of one example of a turbomachine 10, also referred to herein as turbomachine engine 10. More particularly, FIG. 1 depicts the turbomachine engine 10 configured as a gas turbine engine that may be utilized within an aircraft in accordance with aspects of the present subject matter. The gas turbine engine is shown having a longitudinal or centerline axis 12, also referred to herein as a centerline, extending therethrough for reference purposes. In general, the turbomachine engine 10 may include a core engine 14 and a fan section 16 positioned upstream thereof. The core engine 14 may generally include a substantially tubular external housing 18 that defines an annular inlet 20. In addition, the external housing 18 may further enclose and support a compressor section 23. For the example show, the compressor section 23 includes a booster compressor 22 and a high-pressure compressor 24. The booster compressor 22 generally increases the pressure of the air (indicated by arrow 54) that enters the core engine 14 to a first pressure level. The high-pressure compressor 24, such as a multi-stage, axial-flow compressor, may then receive the pressurized air (indicated by arrow 58) from the booster compressor 22 and further increases the pressure of such air. The pressurized air 58 exiting the high-pressure compressor 24 may then flow to a combustor 26 within which fuel is injected into the flow of pressurized air 58, with the resulting mixture being combusted within the combustor 26.

For the example illustrated, the external housing 18 may further enclose and support a turbine section 29. Further, for the depicted example, the turbine section 29 includes a first, high-pressure turbine 28 and a second, low-pressure turbine 32. For the illustrated examples, one or more of the compressors 22, 24 may be drivingly coupled to one or more of the turbines 28, 32 via a rotating shaft 31 extending along the centerline axis 12. For example, high energy combustion products 60 are directed from the combustor 26 along the hot gas path of the turbomachine engine 10 to the high-pressure turbine 28 for driving the high-pressure compressor 24 via a first, high-pressure drive shaft 30. Subsequently, the combustion products 60 may be directed to the low-pressure turbine 32 for driving the booster compressor 22 and fan section 16 via a second, low-pressure drive shaft 34 generally coaxial with high-pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline axis 12 and positioned exterior to the rotating shaft(s) 31 in a radial (R) direction relative to the centerline axis 12.

Additionally, as shown in FIG. 1, the fan section 16 of the engine may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially extending, circumferentially spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several examples, the low-pressure drive shaft 34 may be directly coupled to the fan rotor assembly 38 to provide a direct-drive configuration. Alternatively, the low-pressure drive shaft 34 may be coupled to the fan rotor assembly 38 via a speed reduction device 37 (for example, a reduction gear or gearbox or a transmission) to provide an indirect-drive or geared drive configuration. Such a speed reduction device(s) 37 may also be provided between any other suitable shafts and/or spools within the turbomachine engine 10 as desired or required.

During operation of the turbomachine engine 10, it should be appreciated that an initial airflow (indicated in FIG. 1 by arrow 50) may enter the turbomachine engine 10 through an associated inlet 52 of the fan casing 40. For the illustrated example, the airflow 50 then passes through the fan blades 44 and splits into a first compressed airflow (indicated by arrow 54) that moves through the by-pass airflow conduit 48 and a second compressed airflow (indicated by arrow 56) which enters the booster compressor 22. In the depicted example, the pressure of the second compressed airflow 56 is then increased and enters the high-pressure compressor 24 (as indicated by arrow 58). After mixing with fuel and being combusted within the combustor 26, the combustion products 60 may exit the combustor 26 and flow through the high-pressure turbine 28. Thereafter, for the shown example, the combustion products 60 flow through the low-pressure turbine 32 and exit the exhaust nozzle 36 to provide thrust for the engine.

Figure 2:
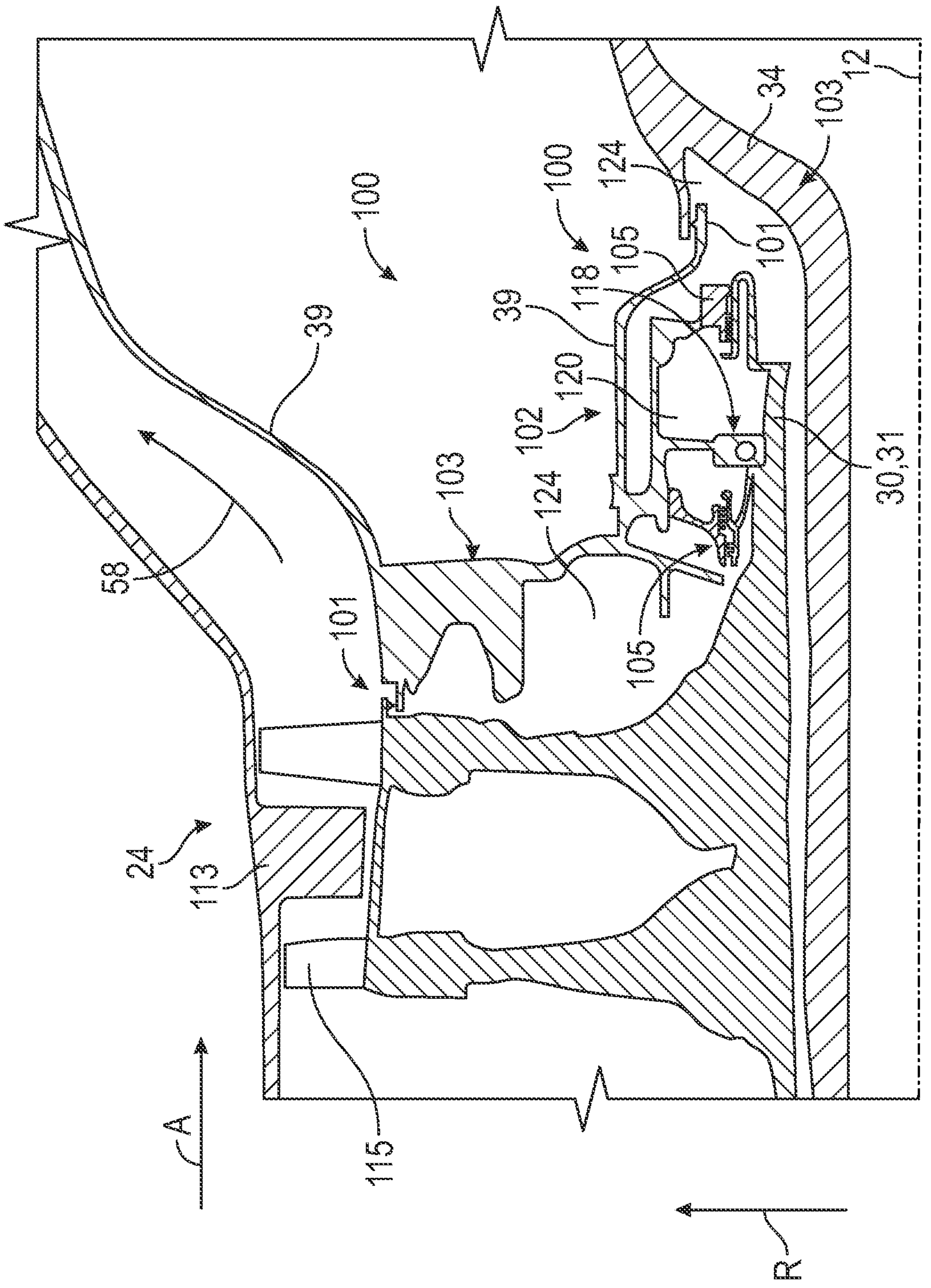
FIG. 2 illustrates a schematic side view of a section of a turbomachine engine including an example of a seal assembly.

Turning now to FIG. 2, the turbomachine engine 10 can include a seal assembly 100, positioned between stationary and rotating components of the turbomachine engine 10. For example, the seal assembly 100 can be positioned between the stationary and rotating components of the high-pressure compressor 24 described above.

The seal assembly 100 may generally isolate a sump housing 102 from the rest of the turbomachine engine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components parts may be coupled to the fixed housing 39 or formed integrally with the fixed housing 39. Similarly, the rotating shaft 31 may also include various intermediary components extending from the rotating shaft 31 to form the sump housing 102. Further, the sump housing 102 at least partially defines a bearing compartment 120 for holding a cooling lubricant (not shown). For instance, the sump housing 102 at least partially radially encloses the cooling lubricant and a bearing 118 (as described in more detail in relation to FIG. 3A). The cooling lubricant (for example, oil) for lubricating the various components of the bearing 118 may circulate through the bearing compartment 120. The seal assembly 100 may include one or more sump seals 105 (as described in more detail in reference to FIGS. 3 and 4) at least partially defining the bearing compartment 120 for holding the cooling lubricant.

The seal assembly 100 further includes a pressurized housing 103 positioned exterior to the sump housing 102. The pressurized housing 103 may at least partially enclose the sump housing 102. For example, as illustrated, the pressurized housing 103 may be positioned both forward and aft relative to the centerline axis 12 of the turbomachine engine 10. The pressurized housing 103 may include at least a portion of the rotating shaft 31 and the fixed housing 39 or intermediary components extending from the rotating shaft 31 and/or the fixed housing 39. For example, the pressurized housing 103 may be formed at least partially by the high-pressure drive shaft 30 and the fixed housing 39 both forward and aft of the sump housing 102.

For the depicted example, the pressurized housing 103 defines a pressurized compartment 124 to at least partially enclose the sump housing 102. In the exemplary example, bleed air from the compressor section 23 (FIG. 1), the turbine section 29 (FIG. 1), and/or the fan section 16 (FIG. 1) may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal(s) 105.

Further, the seal assembly 100 may include one or more seals to further partially define the pressurized compartment 124 (such as the seal assemblies 200, 400, and 500 as described in more detail in regard to FIGS. 4-11). For instance, one or more sealing elements may be positioned between the rotating shaft 31 and the fixed housing 39.

Figure 3A:
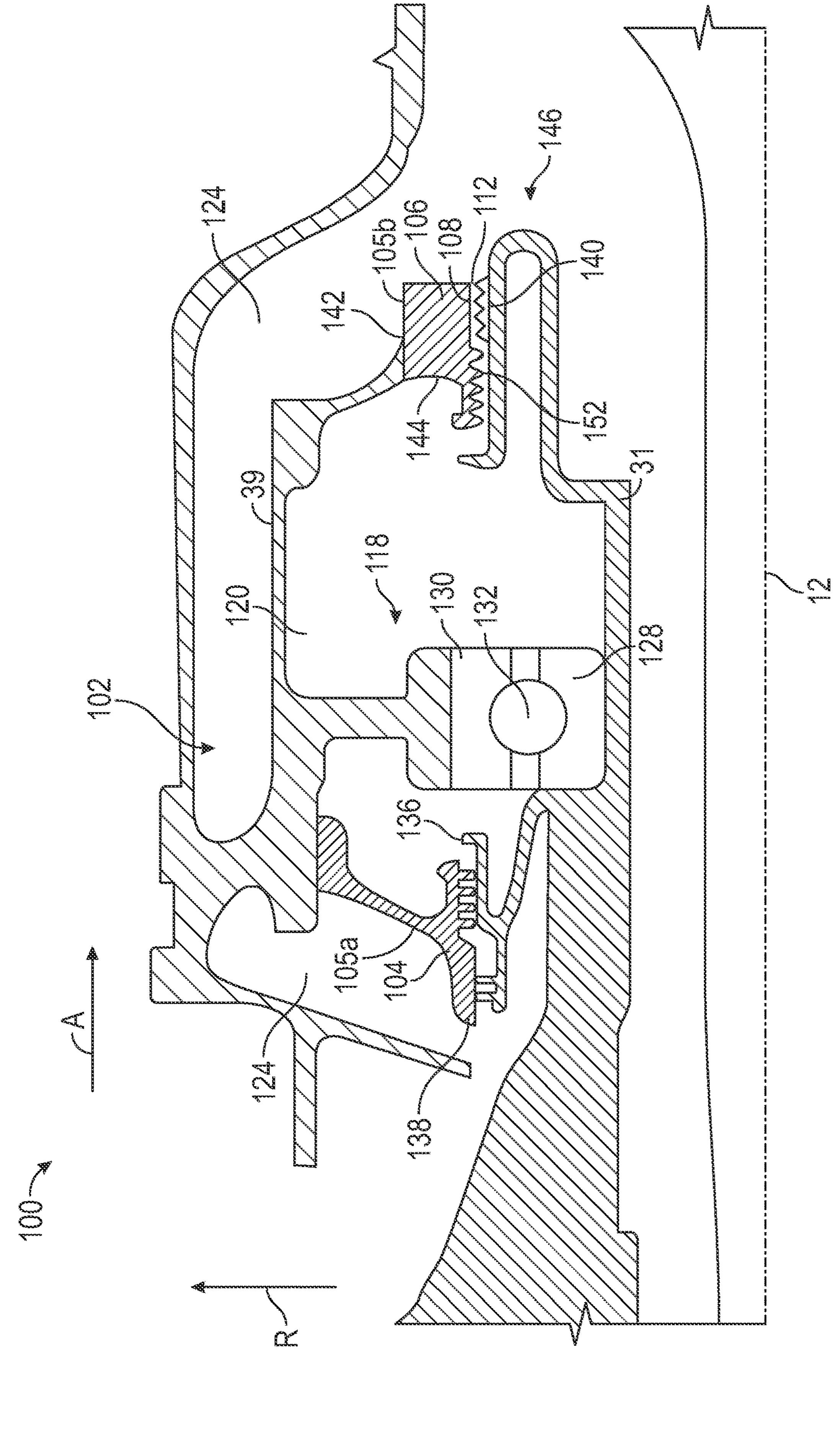
FIG. 3A illustrates an enlarged view of the seal assembly depicted in FIG. 2.

Referring now to FIG. 3A, a closer view of the sump housing 102 is illustrated according to aspects of the present disclosure. In the illustrated example, the seal assembly 100 includes the bearing 118. The bearing 118 may be in contact with an exterior surface of the rotating shaft 31 and an interior surface of the fixed housing 39. It should be recognized that the rotating shaft 31 may be the high-pressure drive shaft 30 or the low-pressure drive shaft 34 described in regard to FIG. 1 or any other rotating drive shaft of the turbomachine engine 10. The bearing 118 may be positioned radially between the portion of the rotating shaft 31 and the portion of the fixed housing 39 that form the sump housing 102. As such, the bearing 118 may be positioned within the sump housing 102. The bearing 118 may support the rotating shaft 31 relative to various fixed components in the engine.

In the depicted example, the bearing 118 may be a thrust bearing. That is, the bearing 118 may support the rotating shaft 31 from loads in the axial (A), or the axial (A) and radial (R) directions relative to the centerline axis 12. For example, the bearing 118 may include an inner race 128 extending circumferentially around an outer surface of the rotating shaft 31. In the shown example, an outer race 130 is disposed radially outward from the inner race 128 and mates with the fixed housing 39, such as an interior surface of the sump housing 102. The inner and outer races 128, 130 may have a split race configuration. For the depicted example, the inner and outer races 128, 130 may sandwich at least one ball bearing 132 therebetween. Preferably, the inner and outer races 128, 130 sandwich at least three ball bearings 132 therebetween.

In additional examples, the bearing 118 may be a radial bearing. That is, the bearing 118 may support the rotating shaft 31 from loads generally in the radial (R) direction relative to the centerline axis 12. In other examples, the inner race 128 and outer race 130 may sandwich at least one cylinder, cone, or other shaped element to form the bearing 118.

Still referring to FIG. 3A, the seal assembly may include two sump seals 105. Each of a first sump seal **105*a* and a second sump seal 105*b* may be positioned between the rotating shaft 31 and the fixed housing 39 to at least partially define the bearing compartment 120 for housing the cooling lubricant and the bearing 118. For example, the first sump seal 105*a* may be positioned forward of the bearing 118, and the second sump seal 105*b* may be positioned aft of the bearing 118. For the illustrated example, the first sump seal 105*a* may be a labyrinth seal 104, and the second sump seal 105*b* may be a carbon seal 106. Although, the two sump seals 105 may be any suitable type of seal, in other examples, the sealing system may include further sump seals 105, such as three or more. For example, in other examples, multiple labyrinth seals, carbon seals, and/or hydrodynamic seals may be utilized in the sump housing 102** in any arrangement.

FIG. 3A also more closely illustrates the labyrinth seal 104 and the carbon seal 106. For the example depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other examples, one or both of the sump seals 105 may be a contact seal. Each type of seal may operate in a different manner. For the depicted example, the labyrinth seal 104 includes an inner surface 136 (coupled to the rotating shaft 31) and an outer surface 138 (coupled to the fixed housing 39). For example, a tortuous path (not shown) extending between the inner and outer surfaces 136, 138 prevents the cooling lubricant from escaping the sump housing 102. For the exemplary example shown, the air pressure on an outer side of the labyrinth seal 104 (that is, in the pressurized compartment 124) is greater than the air pressure on the inner side of the labyrinth seal 104 (that is, in the bearing compartment 120). In this respect, the stationary and rotating components may be separated by an air film (sometimes called an air gap) during relative rotation therebetween.

The carbon seal 106 may, in some examples, be a hydrodynamic or non-contacting seal with one or more hydrodynamic grooves 140 that is positioned between the stationary and rotating components, as illustrated in FIG. 3A. In general, the hydrodynamic grooves 140 may act as pump to create an air film between the non-contacting carbon seal 106 and the rotating shaft 31. For example, as the rotating shaft 31 rotates, fluid shear may direct air in a radial gap 112 into the hydrodynamic groove(s) 140. As air is directed into the hydrodynamic grooves 140, the air may be compressed until it exits the hydrodynamic groove(s) 140 and forms the air film to separate the rotating shaft 31 and the non-contacting carbon seal 106. The air film may define the radial gap 112 between the stationary and non-stationary components of the seal assembly 100, as shown in FIG. 3A. Thus, the rotating shaft 31 may ride on the air film instead of contacting an inner sealing surface 108.

In some examples, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, the carbon seal 106 lifts off of the rotating shaft 31 and/or the hairpin member 146 when the rotating shaft 31 rotates at sufficient speeds.

Figure 3B:
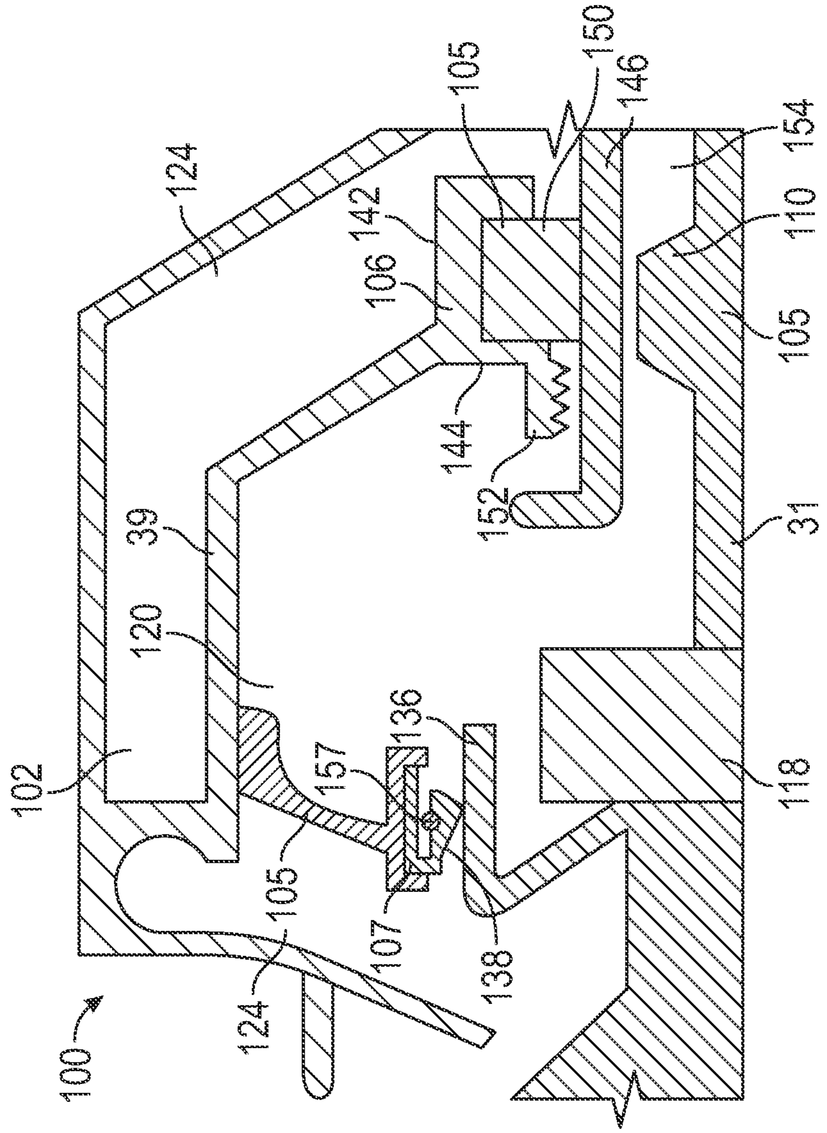
FIG. 3B illustrates a schematic side view of a section of a turbomachine engine including a seal assembly.

Referring now to FIG. 3B, a sump housing 102 of a seal assembly 100 is illustrated according to another aspect of the present disclosure. It should be noted that the description of the seal assembly 100 of FIG. 3A applies to like parts of the seal assembly 100 of FIG. 3B unless otherwise noted, and accordingly like parts will be identified with like numerals.

The sump housing 102 of FIG. 3B particularly illustrates the sump housing 102 with three sump seals 105. The sump housing 102 may generally be configured as the sump housing 102 of FIG. 3A. For example, the sump housing 102 may include a portion of the rotating shaft 31, a portion of the fixed housing 39, and enclose the bearing 118. Further, the sump seals 105 and the sump housing 102 at least partially define the bearing compartment 120.

In the example illustrated, one of the sump seals 105 is a contacting lip seal 107. As such, the inner surface 136 and the outer surface 138 may be in contact in order to seal the sump housing 102. Further, a spring 157 may be in compression between the outer surface 138 and the fixed housing 39 to maintain contact between the inner and outer surfaces 136, 138. The illustrated example further includes a carbon seal 106 configured as a contacting carbon seal. As such, the carbon seal 106 includes a carbon element 150 in sealing engagement with the rotating shaft 31. For the example depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further examples, one of the sump seals 105 may be a brush seal. In such examples, the brush seal may contain a plurality of bristles (such as carbon bristles) in sealing engagement between the rotating shaft 31 and the fixed housing 39.

Another example seal assembly 200 that may be used with the turbomachine engine discussed above is illustrated in FIGS. 4 and 5. It should be noted that the description of the seal assembly 100 of FIGS. 2, 3A and 3B applies to like parts of the seal assembly 200 of FIGS. 4 through 6 unless otherwise noted, and accordingly like parts will be identified with like numerals.

Figure 4:
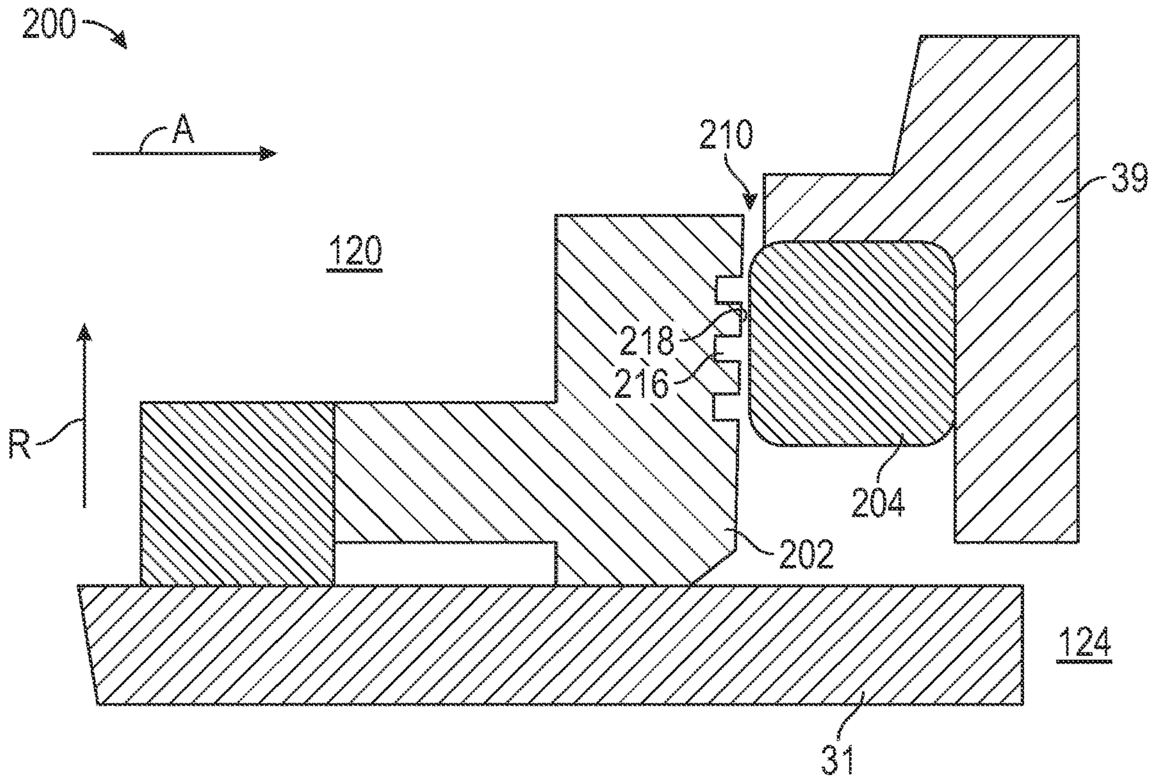
FIG. 4 illustrates a schematic view of a non-contacting seal assembly according to another example.

As shown in FIG. 4, the seal assembly 200 can be a face seal positioned between the components of the rotating shaft 31 and the components of the fixed housing 39 and can comprise a runner 202 disposed circumferentially around and statically coupled to the rotating shaft 31 and a sealing element 204 statically coupled to the fixed housing 39.

During the operation of a turbomachine engine 10 that includes the seal assembly 200, the rotation of the shaft 31 causes the corresponding rotation of the runner 202 connected to the rotating shaft 31. The runner 202 contacts the sealing element 204 along an interfacial zone 210. The interfacial zone 210 can, in some examples, form a boundary between two chambers, such as the bearing compartment 120 and the pressurized compartment 124 described above, and illustrated in FIG. 3A. Accordingly, the interfacial zone 210 can, in some examples, prevent the flow of fluids between the two chambers.

In some examples, such as that illustrated in FIG. 4, the seal assembly 200 can be a hydrodynamic seal. In such examples, the sealing element 204 and/or the runner 202 can have hydrodynamic features such as hydrodynamic grooves 216. The hydrodynamic grooves 216 function in substantially the same way as the hydrodynamic grooves 140 (FIG. 3A) in the non-contacting hydrodynamic seal 101 (FIG. 2) described above to create an air cushion in a gap 210 between the runner 202 and the sealing element 204. As the shaft 31 and the connected runner 202 rotate relative to the sealing element 204 and the fixed housing 39, the air cushion prevents the sealing element 204 and the runner 202 from coming into contact, while preventing the flow of fluids such as lubricant between the two chambers separated by the seal, such as the bearing compartment 120 and the pressurized compartment 124.

Figure 5:
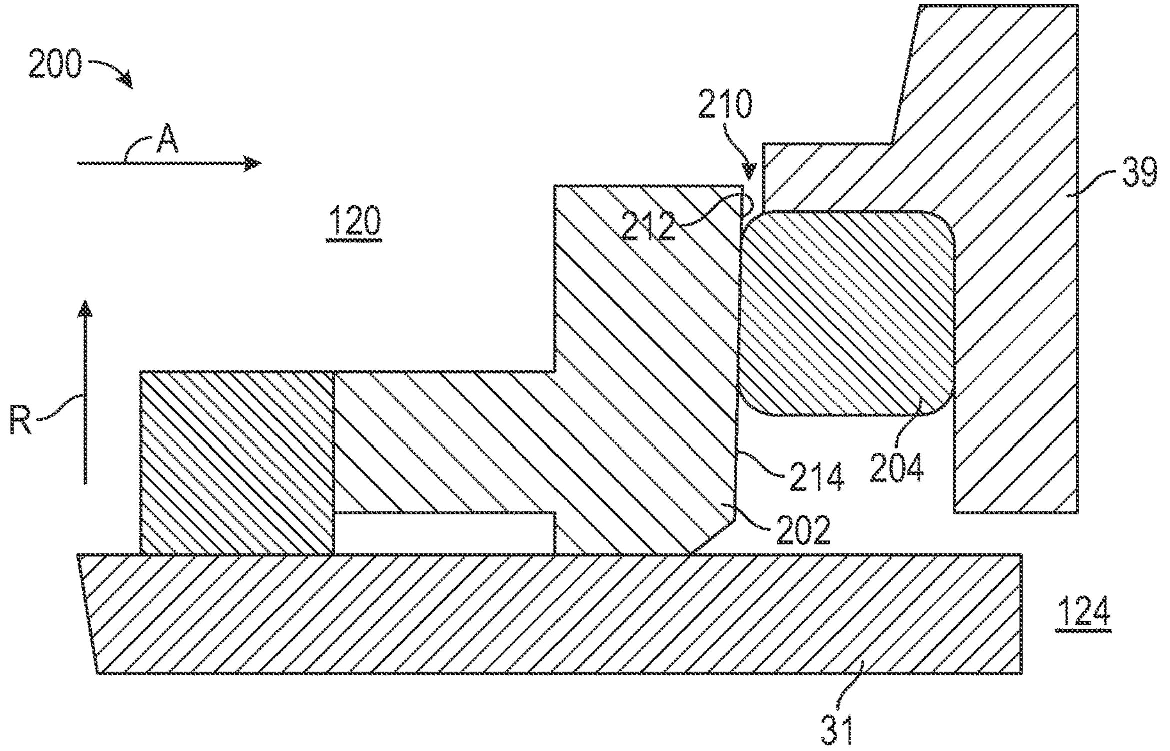
FIG. 5 illustrates a schematic view of a contacting seal assembly according to one example.

In other examples, such as that illustrated in FIG. 5, the seal assembly 200 can be a contact seal, such as those discussed above. In such examples, the interfacial zone 210 is formed by the contact between a first surface 212 of the runner 202 and a second surface 214 of the sealing element 204. When the turbomachine engine 10 including the seal assembly 200 is in an operational condition, the first surface 212 of the runner 202 can rotate against the second surface 214 of the sealing element 204. The friction of the dynamic contact between the first surface 212 and the second surface 214 can cause the second surface 214 of the sealing element 204 to wear and/or abrade until it conforms to the surface features of the first surface 212 of the runner 202.

Due to the high relative rotational speed between the runner 202 and the sealing element 204 along the interfacial zone 210, large quantities of heat may be built up in the various components of the seal assembly 200, particularly the runner 202 and/or the sealing element 204. When too much heat buildup occurs, the parts may expand unevenly, causing warping or distortion of the seal assembly components. Particularly in the case of the runner 202 and/or the sealing element 204, such warping or distortion can cause improper contact along the interfacial zone 210 or improper spacing between the runner 202 and the sealing element 204, which can lead to undesirable abrasion and wear of one or both of the runner 202 and/or the sealing element 204. Such abrasion and wear can cause the performance of the seal assembly 200 to degrade, can permit leaks of oil from the low-pressure side of the seal assembly 200 to the high-pressure side of the seal assembly 200, and in extreme cases, can cause the seal assembly 200 to fail. This necessitates cooling mechanisms to remove generated heat from the components of seal assemblies such as seal assembly 200.

Moreover, existing systems for cooling the runner of a seal assembly frequently cool only at select locations around the circumference of the runner. For instance, some cooling systems utilize a plurality of axially oriented and radially spaced apart bores and/or channels to direct a flow of lubricant through the body of the runner (such as runner 202). This causes the runner to receive uneven cooling, with portions of the runner near to the bores and/or channels receiving more cooling than portions of the runner further away from the bores and/or channels. In turn, this can cause the expansion and/or distortion of the runner to occur unevenly, as different portions of the volume of the runner may be at different temperatures while the turbomachine engine is in the operational state.

To address these concerns, various seal assemblies (examples of which will be discussed in greater detail below) can be designed with a runner that comprises cooling features designed to provide additional cooling to the runner and to cool the runner more evenly than would be achieved with a plurality of bores and/or channels. In some examples, a lubricant source (such as a lubricant reservoir or a pressurized lubricant jet, discussed in greater detail below) can also be included to ensure a steady supply of lubricant for the runner.

Figure 6:
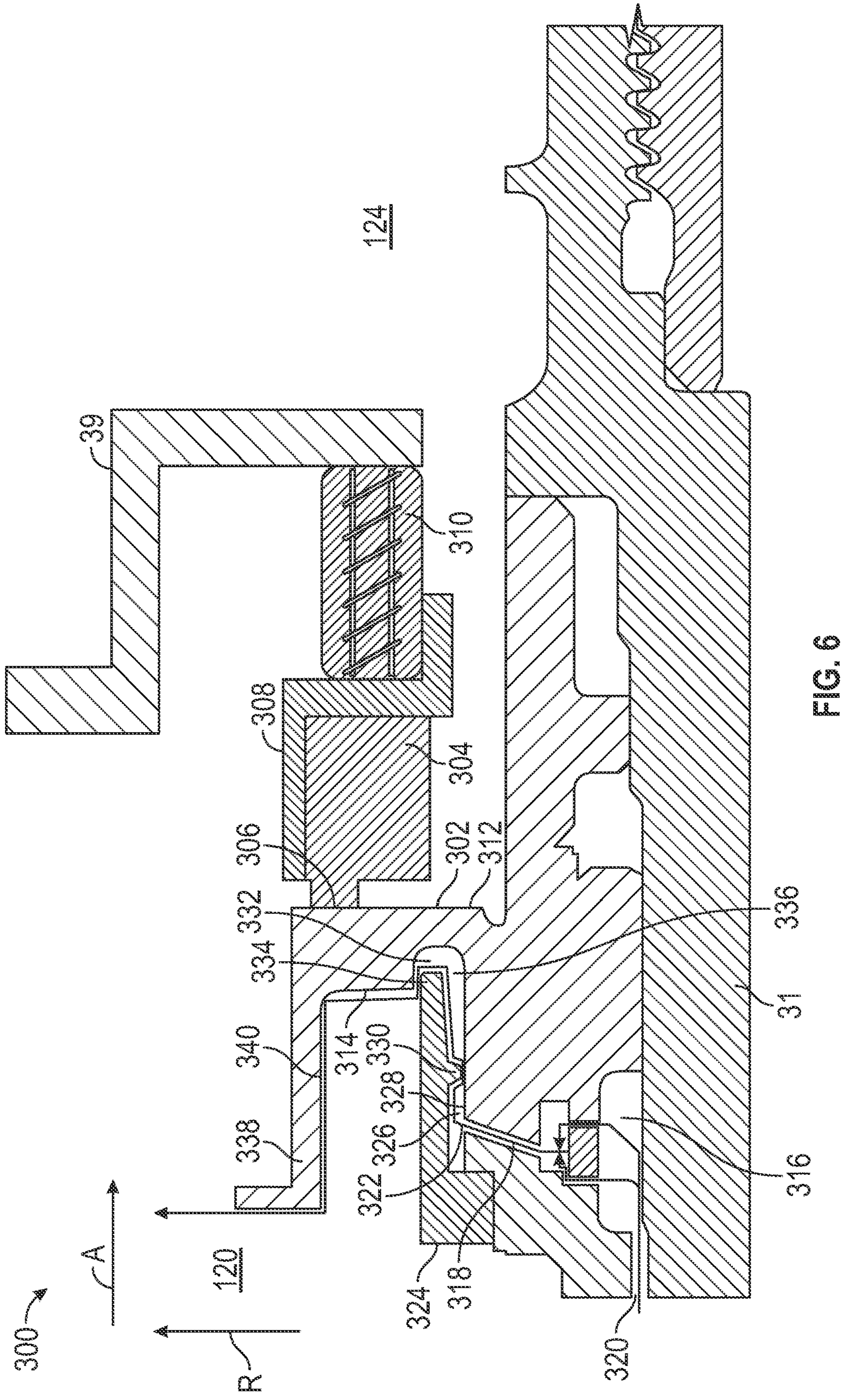
FIG. 6 is a schematic showing a seal assembly having a cooling mechanism according to one example.

FIG. 6 illustrates one example of a seal assembly 300 with additional cooling features. As shown in FIG. 6, the seal assembly 300 comprises a runner 302 coupled to the rotating shaft 31 and a sealing element 304 coupled to the engine housing 39. The region of contact between the runner 302 and the sealing element 304 (or in the case of a hydrodynamic seal, the gap between the runner 302 and the sealing element 304) can define an interfacial zone 306. The runner 302 can have a first surface 312 oriented towards the sealing element 304. The runner 302 can also have a second surface 314 axially opposite the first surface 312 and oriented towards the bearing compartment 120.

The sealing element 304 can be statically coupled to a seal housing 308, which in turn may be operationally coupled to the fixed engine housing 39. In some examples, such as that shown in FIG. 6, the seal housing 308 can be separated from the fixed engine housing 39 by a spring element 310. The spring element 310 allows the sealing element 304 and the seal housing 308 to move in the axial (A) direction relative to the runner 302 (for example, along the centerline axis 12 of the turbomachine engine 10, as shown in FIG. 1) in response to external forces, or to forces imparted either by contact with the runner 302 or the pressure of the hydrodynamic effect described above in relation to carbon seal 106 as illustrated in FIG. 3A. This allows the contact force between the runner 302 and the sealing element 304 in the case of contact seals, or the gap between the runner 302 and the sealing element 304 in the case of hydrodynamic seals, to be adjusted during the operation of the engine.

In some examples, second surface 314 of the runner 302 can be open to the bearing compartment 120, and a lubricant and/or coolant such as oil from the bearing compartment 120 can come in contact with the second surface 314 of the runner 302. When the engine is in the operational state, the rotational movement of the runner 302 along with the rotating shaft 31 can cause the lubricant from the bearing compartment 120 to flow outwards in the radial (R) direction across the second surface 314 of the runner 302. The lubricant reaches the outer diameter of the runner 302 and is returned to the bearing compartment 120. The flow of the lubricant across the second surface 314 of the runner 302 thereby provides an active cooling effect to remove heat from the runner 302.

More particularly, the lubricant comes into contact with the second surface 314 of the runner 302 and absorbs heat from the runner 302 while it is in contact with the second surface 314. The contact between the lubricant and the second surface 314 of the runner 302 continues, as the rotational movement of the runner 302 causes the lubricant to travel outwards in the radial (R) direction across the second surface 314 of the runner 302. In this way, the lubricant can form a full-diameter thin film across the second surface 314 of the runner 302, which absorbs heat with greater uniformity and provides more contact between the runner 302 and the lubricant than would be achieved by cooling bores or channels. In some examples, the lubricant can completely or substantially completely cover the second surface 314 of the runner 302, forming a uniform or substantially uniform thin film. As the lubricant reaches the outer diameter of the second surface 314 of the runner 302, it is centrifugally spun free of the runner 302 and re-enters the bearing compartment 120. Because lubricant is continually introduced to and removed from the runner 302 in this way, heat may be continually removed from the runner 302.

In some examples, such as that shown in FIG. 6, the flow of lubricant across the second surface 314 can be improved by the addition of a first reservoir 316 and a fluid passageway 318, fluid passageway 318 (such as a channel or a bore) to the runner 302. The first reservoir 316 can be disposed radially inwards of portions of the runner 302 (for example, the first reservoir 316 can be an annular chamber disposed around the rotating shaft 31 and partially defined by the runner 302 as shown in FIG. 6), can contain a volume of lubricant, and can be fed by an inlet 320 that admits lubricant from the bearing compartment 120 to the first reservoir 316. The fluid passageway 318 can extend from the first reservoir 316 to the radially innermost portion of second surface 314 of the runner 302. When the engine is in the operational state, the rotational movement of the shaft 31 and the runner 302 cause lubricant to flow through the fluid passageway 318 from the first reservoir 316 to the second surface 314 of the runner 302, in the direction indicated by arrow 322. In this way, a steady flow of lubricant across the second surface 314 of the runner 302 can be ensured.

Furthermore, because the lubricant comes into contact with the second surface 314 at the radially innermost portions of the second surface 314 and travels outwards in the radial (R) direction along the second surface 314 until being spun free to return to the bearing compartment 120, the flow path of the lubricant across the second surface 314 is lengthened. Thus, the lubricant remains in contact with the second surface 314 of the runner 302 longer and removes a correspondingly greater amount of heat than would be achieved without the inclusion of the first reservoir 316 and the fluid passageway 318.

With continued reference to FIG. 6, the seal assembly 300 can also include a deflector 324. The deflector 324 can be disposed outwards in the radial (R) direction from a portion of the runner 302, the first reservoir 316, and the fluid passageway 318, and can extend in the axial (A) direction from the bearing compartment 120 towards the second surface 314 of the runner 302. The deflector 324 can be spaced apart in the radial (R) direction from the runner 302, and along with the runner 302 can form a pathway 326 through which the lubricant can flow. The deflector 324 can be positioned such that it impinges the flow of lubricant from the first reservoir 316 to the second surface 314 of the runner 302, forcing the lubricant to flow in the axial (A) direction along an axial portion 328 of the runner 302 before it can reach the second surface 314 of the runner 302. Thus, the presence of the deflector 324 further extends the total time of contact between the lubricant and the runner 302 and enables the lubricant to remove correspondingly more heat from the runner 302 before returning to the bearing compartment 120.

In some examples, the deflector 324 may also comprise one or more protrusions 330 that narrow the pathway 326 at a variety of points, further lengthening the distance the lubricant must travel to reach the second surface 314 of the runner 302 and causing points of elevated pressure and correspondingly elevated lubricant concentration. While FIG. 6 illustrates a deflector 324 having only a single protrusion 330, it is to be understood that in other examples, the deflector 324 can comprise a plurality of protrusions 330, which may give the pathway 326 a tortuous profile.

The runner 302 can also include an annular cavity 332. The annular cavity 332, as illustrated in FIG. 6, can be formed in the second surface 314 of the runner 302, and can be configured to receive an end portion 334 of the deflector 324. The annular cavity 332 and the end portion 334 of the deflector 324 can, as shown in FIG. 6, define a second reservoir 336. The second reservoir 336 can capture lubricant as it leaves the pathway 326, slowing the flow of the lubricant from the pathway 326 to the second surface 314 of the runner 302 and further increasing the contact time between the lubricant and the runner 302, and correspondingly increasing the quantity of heat removed from the runner 302.

With continued reference to FIG. 6, the runner 302 can also include a hairpin member 338. The hairpin member 338 can be disposed along the radially outermost portion of the runner 302 (that is, along the outer diameter of the runner 302) and can extend in the axial (A) direction away from the second surface 314 of the runner 302 towards the bearing compartment 120. The hairpin member 338 can provide additional contact surface area by extending the second surface 314 of the runner 302 with the addition of an axially extending inner wall portion 340 to the second surface 314. When the lubricant flows outwards in the radial (R) direction across the second surface 314 of the runner 302, it must also flow over the inner wall portion 340 before returning to the bearing compartment 120. This increases the total time that the lubricant is in contact with the second surface 314 of the runner 302, and correspondingly increases the quantity of heat removed from the runner 302.

While the hairpin member 338 is illustrated in FIG. 6 as having a substantially even thickness along its length in the axial (A) direction, it is to be understood that in other examples, the hairpin member 338 can have a tapering cross section that narrows as the hairpin member 338 extends axially away from the second surface 314 of the runner 302. This may offer structural support and improved control over rotational balance to the runner 302.

Figure 7:
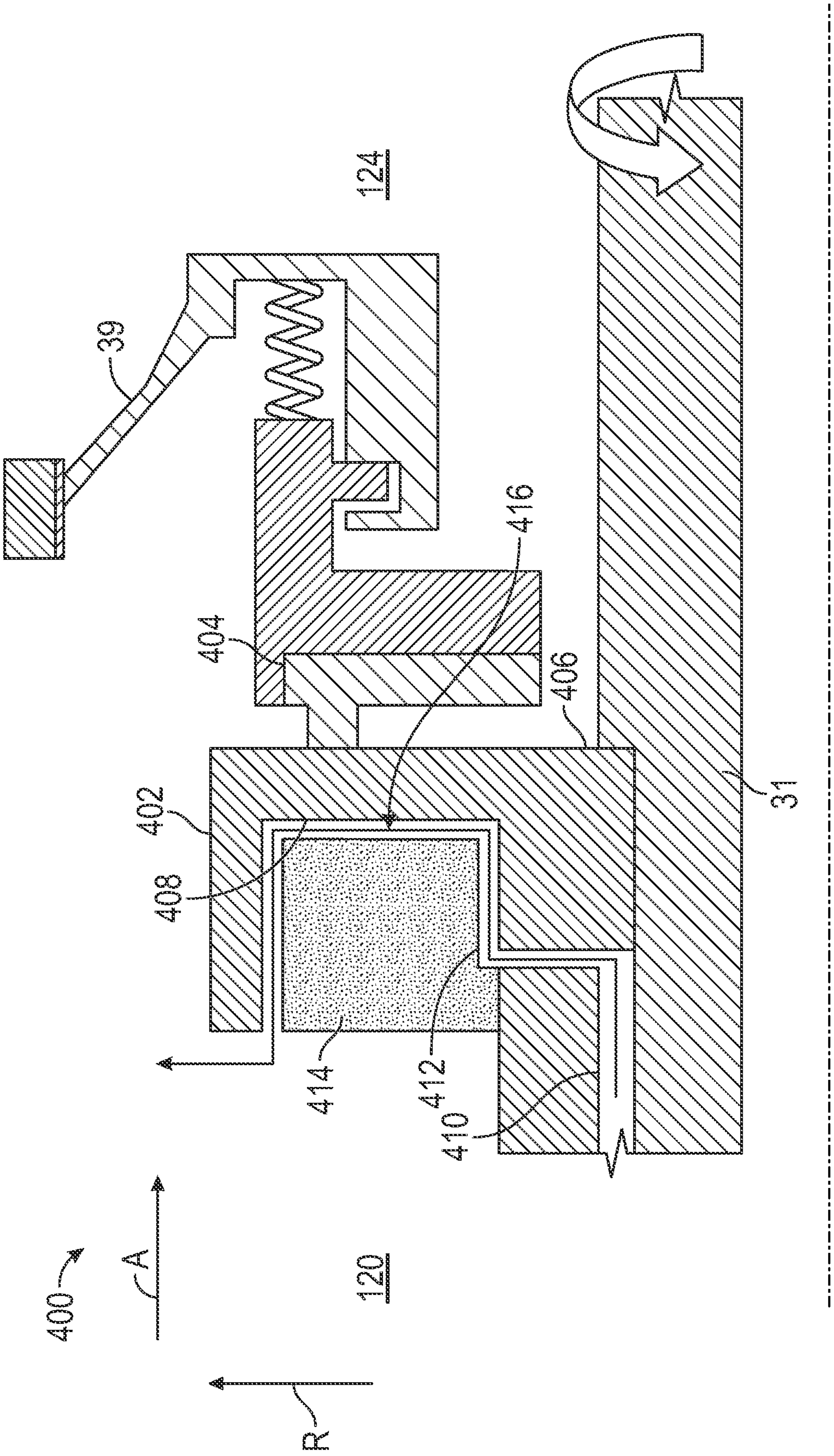
FIG. 7 is a schematic showing a seal assembly having a cooling mechanism according to another example.

In other examples, the seal assembly can include a porous lattice disposed adjacent to the runner to retain a lubricant and/or coolant material against the runner. FIG. 7 shows a seal assembly 400 having a porous lattice disposed adjacent to the runner. The seal assembly 400 can have the same or substantially the same configuration as seal assembly 300, as previously described, except for the differences described below.

As shown in FIG. 7, the seal assembly 400 can comprise a runner 402 coupled to the rotating shaft 31 and a sealing element 404 coupled to the fixed housing 39. The runner 402 can contact the sealing element 404 along a first surface 406 and is in communication with the bearing compartment 120 along a second surface 408. This allows lubricant from the bearing compartment 120 to come in contact with the second surface 408 to cool the runner 402 in the manner discussed above in relation to the seal assembly 300 (FIG. 6).

Figure 8:
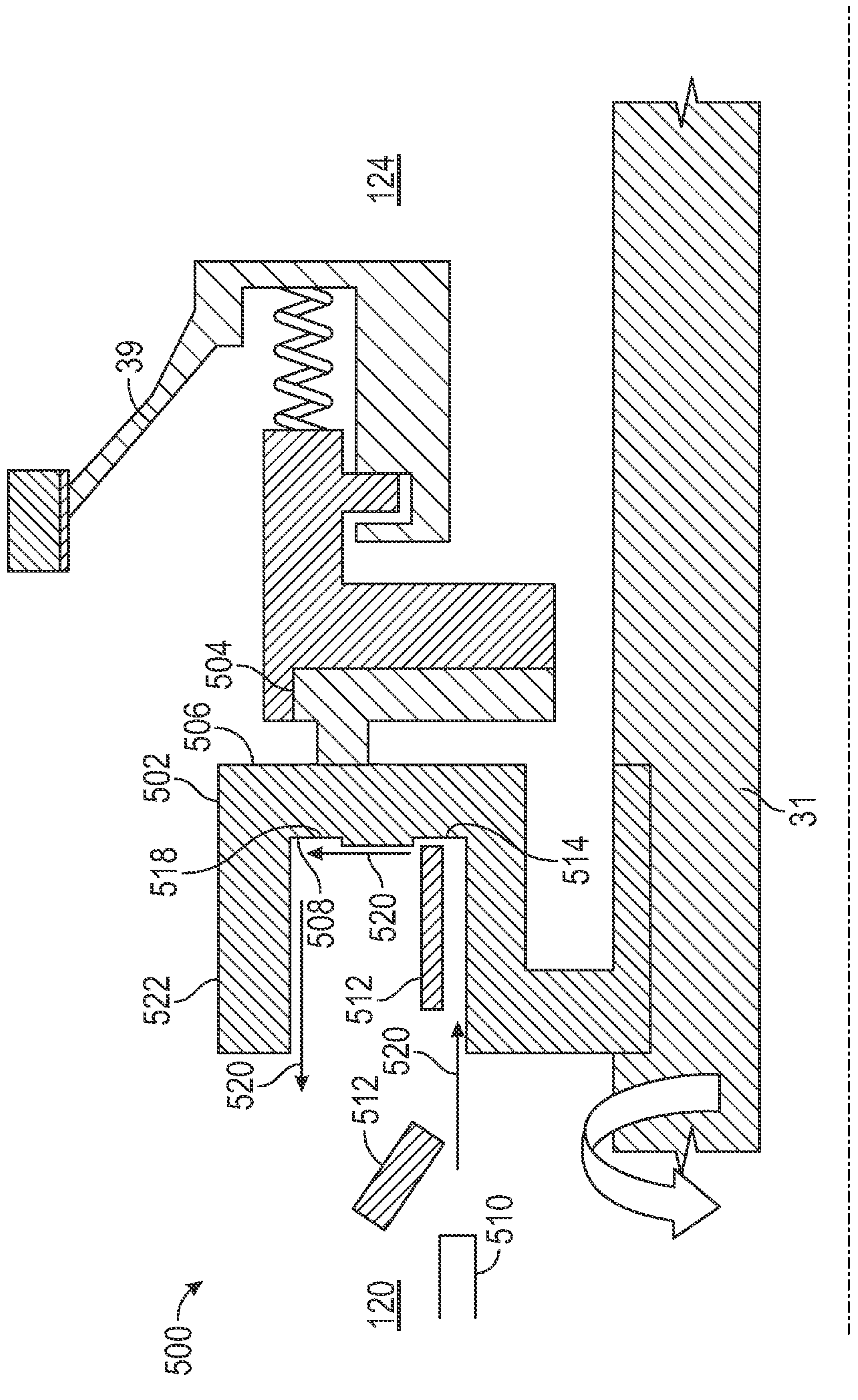
FIG. 8 is a schematic showing a seal assembly having a cooling mechanism according to a third example.

The runner 402 can also comprise a reservoir 410 and a fluid passageway 412 (such as a channel or a bore). The fluid passageway 412 can comprise one or more bores or channels extending through the runner 402 to the second surface 408, as shown in FIG. 8, or can be defined by a plurality of other components such as a deflector and one or more projections as described above in relation to the seal assembly 300 (FIG. 6). As described above in reference to the seal assembly 300, the reservoir 410 can be in fluid communication with the bearing compartment 120 and can be configured to store a volume of lubricant that can be distributed to the second surface 408 of the runner 402. Also as described above in reference to the seal assembly 300, the fluid passageway 412 can carry lubricant from the reservoir 410 to the second surface 408 of the runner 402 to facilitate active cooling of the runner 402.

With continued reference to FIG. 7, the runner 402 can also comprise a lattice element 414. The lattice element 414 can be disposed adjacent to the second surface 408 of the runner 402 and can be in fluid communication with the reservoir 410 and/or the bearing compartment 120. In some examples, the runner 402 can comprise a single lattice element 414 with an annular geometry disposed concentrically in an annular groove 416 in the second surface 408. In other examples, a plurality of lattice elements 414, each having a body extending in the axial (A) direction and a cross section (for example, a circular cross section, a square cross section, a polygonal cross section, or any other cross section of suitable geometry) that fits within the annular groove 416, can be disposed in the annular groove 416 and spaced apart from each other in the radial (R) direction along the circumference of the runner 402.

The lattice element 414 can have a structure comprising a plurality of interconnected pores (for example, pores forming a honeycomb structure or foam-like structure). The interconnected pores can allow fluid, such as the lubricant previously described, to pass through the lattice element 414 in the radial, axial (A), and circumferential directions and provide a flow path along the second surface 408 of the runner 402. The interconnected pores also allow the lattice element 414 to retain additional lubricant and to be in fluid communication (and therefore in thermal communication) with the thin lubricant film disposed along the second surface 408 of the runner 402. This allows for heat transfer from the runner 402 to the lattice element 414 and the lubricant retained in the lattice element 414 and allows a greater volume of lubricant to be in thermal communication with the runner 402.

Additionally, the porous structure of the lattice element 414 can cause the lubricant to take a tortuous pathway through the pores of the lattice element 414 as it travels from the radially innermost portions of the runner 402 to the radially outermost portions of the runner 402 as previously described. Because the tortuous pathway is longer than a direct pathway along the second surface 408 of the runner 402, and because the lubricant is in thermal communication with the runner 402 as it travels through the lattice element 414, the lubricant absorbs heat from the runner 402 for a longer period of time than would be the case in the absence of the lattice element 414.

In some examples, the lattice element 414 can comprise a plurality of fluid passageways (such as bores or channels) extending in the radial (R) direction and/or the axial (A) direction through the solid body. The fluid passageways can be in lieu of or included in addition to the porous structure of the lattice element 414. Advantageously, the addition of fluid passageways to the lattice element 414 can increase the volume of lubricant retained in the lattice element 414, and thus the quantity of lubricant that can be in thermal communication with the runner 402.

The lattice element 414 can be formed separately from the runner 402 or can be integrally formed with the runner 402. For example, the lattice element 414 can be additively manufactured in the annular groove 416. In other examples, the lattice element 414 can be cold sprayed or electrochemically formed in the annular groove 416.

Generally, the lattice element 414 comprises a metal that can be additively manufactured and which has a high thermal capacity and/or high thermal conductivity. In some examples, the lattice element 414 can comprise additively manufactured, cold sprayed, or electrochemically formed steel or nickel-based superalloys. Advantageously, such materials allow the lattice element 414 to rapidly absorb and dissipate heat from the runner 402 and transfer the heat more quickly away from the runner 402. It is to be understood, however, that a wide variety of other materials amenable to additive manufacturing, cold spraying, or electrochemical formation having high thermal capacity or high thermal conductivity may be suitable for forming the lattice element 414.

In other examples, the seal assembly can include a directed oil jet and one or more deflectors to the runner to cause an active flow of lubricant across the runner. FIG. 8 shows a seal assembly 500 having a directed oil jet and one or more deflectors. The seal assembly 500 can have the same or substantially the same configuration as seal assemblies 300 and 400, as previously described, except for the differences described below.

As shown in FIG. 8, the seal assembly 500 can comprise a runner 502 coupled to the rotating shaft 31 and a sealing element 504 coupled to the fixed housing 39. The runner 502 can contact the sealing element 504 along a first surface 506 and is in fluid communication with the bearing compartment 120 along a second surface 508, allowing lubricant from the bearing compartment 120 to come in contact with the second surface 508 to cool the runner 502 in the manner discussed above in relation to the seal assemblies 300 and 400.

The seal assembly 500 can also include a pressurized oil jet 510 to direct lubricant against the second surface 508 of the runner 502. As shown in FIG. 8, lubricant from the pressurized oil jet 510 can be further directed by one or more deflectors 512, which ensure that the lubricant comes in contact with the second surface 508 at a radially inner portion 514 and flows outwards in the radial (R) direction across the second surface to a radially outer portion 518 as indicated by arrow 520.

The runner 502 can also include a hairpin member 522, which functions identically to the hairpin member 338 (FIG. 6) described above in relation to the seal assembly 300 (FIG. 6), extending the flow pathway of the lubricant by requiring the lubricant to flow axially in the direction indicated by arrow 520 before returning to the bearing compartment 120. This increases the time of contact between the lubricant and the runner 502, and correspondingly increases the amount of heat removed from the runner 502 by the lubricant, as discussed above.

It is to be appreciated that the various features for distributing lubricant from the bearing compartment 120 to form a thin film of lubricant on the runner (for example, runners 302, 402, 502), such as lubricant reservoirs, lubricant channels, deflectors, hairpin members, porous lattices, and directed oil jets can be used alone or in any combination of these features, such that any or all of the combination of these features distributes lubricant to the components of the seal assemblies previously discussed.

In this way, the runner of the seal assemblies disclosed herein can be actively cooled by a thin film of lubricant evenly distributed along a surface of the runner. This even distribution of lubricant ensures more even cooling of the runner, and thereby avoids the formation of localized heat gradients that can cause uneven thermal expansion, and therefore deformation and/or warping, of the runner. This improves the conformity between the runner and the sealing element and reduces the tendency of the seal assembly to develop leaks or other failures due to poor conformity between the runner and the sealing element.

Further aspects of the disclosure are provided by the subject matter of the following clauses:

A seal assembly for a turbomachine, the turbomachine including a rotating shaft extending along a centerline axis and a fixed housing positioned exterior to the rotating shaft in a radial (R) direction relative to the centerline axis, the seal assembly comprising a sealing element coupled to the fixed housing, a runner comprising a first surface axially oriented towards the sealing element and a second surface oriented away from the sealing element, and a lubricant source; wherein the runner rotates along with the rotating shaft and relative to the sealing element when the turbomachine is in an operational state, and wherein the lubricant source directs a lubricant to the second surface of the runner to reduce the temperature of the runner when the turbomachine is in an operational state.

The seal assembly of the preceding clause, wherein the lubricant forms a thin film that covers all or substantially all of the second surface of the runner.

The seal assembly of any preceding clause, wherein the lubricant source is a reservoir in fluid communication with the second surface of the runner.

The seal assembly of any preceding clause, wherein the runner further comprises a channel extending from the reservoir to the second surface of the runner, wherein the channel carries lubricant from the reservoir to the second surface of the runner while the turbomachine is in the operational state.

The seal assembly of any preceding clause, further comprising a deflector, wherein the deflector is disposed radially outwards of a portion of the runner and to define a portion of the channel.

The seal assembly of any preceding clause, wherein the runner further comprises a hairpin member disposed along an outer diameter of the runner and extending axially away from the sealing element.

The seal assembly of any preceding clause, wherein the hairpin member has a tapering cross section.

The seal assembly of any preceding clause, wherein the lubricant source is a lubricant jet.

The seal assembly of any preceding clause, further comprising one or more deflectors that impinge the pressurized lubricant jet.

The seal assembly of any preceding clause, further comprising a lattice element disposed against the second surface of the runner.

The seal assembly of any preceding clause, wherein the lattice element has a porous or honeycomb structure.

The seal assembly of any preceding clause, wherein the lattice element comprises a plurality of channels, bores, or passageways.

The seal assembly of any preceding clause, wherein the lattice element comprises steel or a nickel-based superalloy.

The seal assembly of any preceding clause, wherein the seal assembly is a face seal and the runner is spaced apart from the sealing element along the centerline axis of the turbomachine.

The seal assembly of any preceding clause, wherein the fixed housing of the turbomachine comprises defines a bearing compartment and a pressurized compartment and wherein the seal assembly is positioned between the bearing compartment from the pressurized compartment.

The seal assembly of any preceding clause, wherein the lubricant is lubricant from the bearing compartment.

The seal assembly of any preceding clause wherein the seal assembly is included in a labyrinth seal of a turbomachine engine.

The seal assembly of any preceding clause wherein the seal assembly is included in an aspirating face seal of a turbomachine engine.

The seal assembly of any preceding clause wherein the seal assembly further comprises a windback that reduces the flow of lubricant between the runner and the sealing element.

A turbomachine comprising a rotating shaft extending along a centerline axis and a fixed housing positioned exterior to the rotating shaft in a radial (R) direction relative to the centerline axis, and a seal assembly comprising a runner statically coupled to the rotating shaft, a sealing element coupled to the fixed housing, a lubricant reservoir, and a lubricant channel; wherein the runner is spaced axially apart from the sealing element along the centerline axis and comprises a first surface oriented towards the sealing element and a second surface oriented away from the sealing element, wherein the lubricant reservoir and the lubricant channel are in fluid communication with the second surface of the runner, and wherein the lubricant reservoir and the lubricant channel distribute a lubricant to the second surface of the runner when the turbomachine is in an operational state, and wherein the lubricant removes heat from the runner.

The turbomachine of any preceding clause, wherein the second surface of the runner comprises an annular groove and the seal assembly comprises a lattice element disposed within the annular groove.

The turbomachine of any preceding clause, wherein the lattice element has a foam-like or honeycomb structure and comprises steel or a nickel-based superalloy.

The turbomachine of any preceding clause, further comprising a deflector, wherein the deflector is disposed radially outwards of a portion of the runner and at least partially defines the lubricant channel.

The turbomachine of any preceding clause, wherein the lubricant forms a uniform or substantially uniform thin film on the second surface of the runner.

A method for cooling a seal assembly comprising: operating a turbomachine engine including a seal assembly, wherein the turbomachine engine comprises a rotating shaft, a fixed housing, and a centerline axis, and the seal assembly comprises a runner and a sealing element spaced apart along the centerline axis; applying a lubricant to a surface of the runner to form a uniform or substantially uniform thin film of lubricant on the surface of the runner; moving the lubricant across the surface of the runner; and removing the lubricant from the surface of the runner.

The method of any preceding clause, wherein the seal assembly is disposed between a bearing compartment and a pressurized compartment, and wherein the lubricant is a lubricant from the bearing compartment.

The method of any preceding clause, wherein the lubricant is applied from one of a reservoir, a pressurized jet, or a lattice element having a porous or honeycomb structure.

The method of any preceding clause, wherein the lubricant removes heat from the runner such that the temperature of the runner does not exceed 450° F.

In view of the many possible examples to which the principles of the disclosure may be applied, it should be recognized that the illustrated examples are only preferred examples of the disclosure and should not be taken as limiting the scope of the disclosure. Rather, the scope of the disclosure is defined by the following claims.

The invention claimed is:

1. A seal assembly for a turbomachine, the turbomachine including a rotating shaft extending along a centerline axis and a fixed housing positioned exterior to the rotating shaft in a radial direction relative to the centerline axis, the seal assembly comprising:

a sealing element coupled to the fixed housing;

a runner comprising a first surface axially oriented towards the sealing element and a second surface oriented away from the sealing element; and a lubricant source;

wherein the runner rotates along with the rotating shaft and relative to the sealing element when the turbomachine is in an operational state, wherein the lubricant source directs a lubricant to the second surface of the runner to reduce the temperature of the runner when the turbomachine is in an operational state, wherein the fixed housing of the turbomachine comprises a bearing compartment and a pressurized compartment and wherein the seal assembly is positioned between the bearing compartment and the pressurized compartment.

2. The seal assembly of claim 1, wherein the lubricant forms a thin film that covers all or substantially all of the second surface of the runner.

3. The seal assembly of claim 1, wherein the lubricant source is a reservoir in fluid communication with the second surface of the runner.

4. The seal assembly of claim 3, wherein the runner further comprises a fluid passageway extending from the reservoir to the second surface of the runner, wherein the fluid passageway carries lubricant from the reservoir to the second surface of the runner while the turbomachine is in the operational state.

5. The seal assembly of claim 4, further comprising a deflector, wherein the deflector is disposed radially outwards of a portion of the runner to define a portion of the fluid passageway.

6. The seal assembly of claim 1, wherein the runner further comprises a hairpin member disposed along an outer diameter of the runner and extending axially away from the sealing element.

7. The seal assembly of claim 1, wherein the seal assembly is a face seal and the runner is spaced apart from the sealing element along the centerline axis of the turbomachine.

8. A turbomachine comprising:

a rotating shaft extending along a centerline axis and a fixed housing positioned exterior to the rotating shaft in a radial direction relative to the centerline axis; and a seal assembly comprising a runner statically coupled to the rotating shaft, a sealing element coupled to the fixed housing, a lubricant reservoir, a deflector, and a lubricant channel;

wherein the runner is spaced axially apart from the sealing element along the centerline axis and comprises a first surface oriented towards the sealing element and a second surface oriented away from the sealing element, wherein the lubricant reservoir and the lubricant channel are in fluid communication with the second surface of the runner, wherein the lubricant reservoir and the lubricant channel distributes a lubricant to the second surface of the runner when the turbomachine is in an operational state and wherein the lubricant removes heat from the runner, and wherein the deflector is disposed radially outwards of a portion of the runner and at least partially defines the lubricant channel.

9. The turbomachine of claim 8, wherein the lubricant forms a uniform or substantially uniform thin film on the second surface of the runner.

10. The turbomachine of claim 8, wherein the deflector comprises one or more protrusions that narrow the fluid passageway at one or more areas.

11. The turbomachine of claim 8, wherein the second surface of the runner comprises a cavity that receives a portion of the deflector.

12. The turbomachine of claim 8, further comprising a hairpin member that extends axially away from the second surface of the runner.

13. A method for cooling a seal assembly comprising:

operating a turbomachine engine including the seal assembly, wherein the turbomachine engine comprises a rotating shaft, a fixed housing, and a centerline axis, and the seal assembly comprises a runner and a sealing element spaced apart along the centerline axis;

applying a lubricant to a surface of the runner to form a uniform or substantially uniform thin film of lubricant on the surface of the runner;

moving the lubricant across the surface of the runner; and removing the lubricant from the surface of the runner, wherein the seal assembly is disposed between a bearing compartment and a pressurized compartment, and wherein the lubricant is a lubricant from the bearing compartment.

14. The method of claim 13, wherein the lubricant is applied from one of a reservoir, a pressurized oil jet, or a lattice element having a porous or honeycomb structure.

15. The method of claim 13, wherein the lubricant removes heat from the runner such that the temperature of the runner does not exceed 450° F.

* * * * *